United States Patent
Biver et al.

(10) Patent No.: US 10,598,818 B2
(45) Date of Patent: Mar. 24, 2020

(54) METHOD FOR DETERMINING GEOLOGICAL CAVES

(71) Applicant: TOTAL SA, Courbevoie (FR)

(72) Inventors: Pierre Biver, Pau (FR); Richard Labourdette, Pau (FR)

(73) Assignee: TOTAL SA, Courbevoie (FR)

( * ) Notice: Subject to any disclaimer, the term of this patent is extended or adjusted under 35 U.S.C. 154(b) by 118 days.

(21) Appl. No.: 15/323,669

(22) PCT Filed: Jul. 3, 2014

(86) PCT No.: PCT/FR2014/051714
§ 371 (c)(1),
(2) Date: Jan. 3, 2017

(87) PCT Pub. No.: WO2016/001491
PCT Pub. Date: Jan. 7, 2016

(65) Prior Publication Data
US 2017/0146691 A1    May 25, 2017

(51) Int. Cl.
*G01V 99/00* (2009.01)
*G01V 1/30* (2006.01)

(52) U.S. Cl.
CPC .............. *G01V 99/005* (2013.01); *G01V 1/30* (2013.01); *G01V 99/00* (2013.01)

(58) Field of Classification Search
USPC .......................................................... 702/2
See application file for complete search history.

(56) References Cited

U.S. PATENT DOCUMENTS

| 5,671,136 A * | 9/1997 | Willhoit, Jr. ............. G01V 1/30 702/18 |
| 2010/0185424 A1 | 7/2010 | Massonnat |
| 2011/0255370 A1* | 10/2011 | Hirabayashi ........... G01V 1/284 367/31 |
| 2015/0219792 A1 | 8/2015 | Massonnat |

FOREIGN PATENT DOCUMENTS

| FR | 2 918 777 A1 | 1/2009 |
| FR | 2 994 309 A1 | 2/2014 |

OTHER PUBLICATIONS

International Search Report PCT/FR2014/051714, dated Jun. 8, 2015, 5 pages.
English translation of International Search Report PCT/FR2014/051714, dated Jun. 8, 2015, 5 pages.

* cited by examiner

*Primary Examiner* — Paul D Lee
(74) *Attorney, Agent, or Firm* — Patterson Thuente Pedersen, P.A.

(57) ABSTRACT

This invention relates to a method for determining a location of karst caves in a geological model. The method comprising for each current point of a set of points of a closed space of the model, determining a distance value; receiving an average value; and for each current point of the set of points of the closed space, determining a presence of caves for the current point. The determination at the presence of caves depends at least on the received average value and on the distance value determined for the current point. A collapse procedure can also be implemented as described in the description.

10 Claims, 7 Drawing Sheets

METHOD FOR DETERMINING GEOLOGICAL CAVES

RELATED APPLICATIONS

The present application is a National Phase entry of PCT Application No. PCT/FR2014/051714, filed Jul. 3, 2014, said application being hereby incorporated by reference herein in its entirety.

FIELD OF THE INVENTION

This invention relates to the field of determining caves in geological models and in particular the field of modeling karst diagenesis phenomena of the insular karst type in carbonate reservoirs.

BACKGROUND OF THE INVENTION

The expression "karstification of a rock" designates the phenomenon through which a rock is shaped par dissolution of carbonates, for example, in water. The water infiltrates through the interstices of the rock, for example pores or fractures. This infiltration increases the size of these interstices due to the dissolution of carbonates of the rock in the infiltrated water. Fractures and cavities (or caves) can as such be formed.

The water can typically be rainwater made acidic through carbon dioxide from the atmosphere or from the ground. The source of the water may be elsewhere, for example from hydrothermal vents.

The rock can, for example, include limestone.

The modeling of karstification is useful in geology and in the framework of the oil industry as it can directly influence the estimation of the hydrocarbon resources present in the substrata.

Moreover, particular karstifications can exist: insular, continental or hydrothermal. Karstification referred to as "insular" is a karstification carried out in particular in particular fields which are islands and the coast via dissolution of the carbonates in the interval zone of the water table and in the zone referred to as "salt water wedge" (chemical contact between the fresh water and sea water).

During the modeling of the phenomenon of karstification, the modeling of caves was hardly taken into account. Yet, this phenomenon can be very substantial and as such highly impact the model obtained, in particular in the framework of insular karstification.

In addition, simulations of karst zones in insular areas cannot be carried out using the usual karst simulation tools. Indeed, the intervals of the water table and the presence of a salt water wedge are particular to the insular and coastal domains. These proper characteristics in particular influence the formation of the karst in these domains.

There is as such a need to allow for effective and correct modeling of the karstification phenomena of the "cave" type in the substratum. This invention improves the situation.

SUMMARY OF THE INVENTION

This invention thus relates to a method for determining a location of karst caves in a geological model,
the method comprising the steps of:
receiving a geological model;
receiving a first surface and a second surface, said first and second surfaces being defined in said geological model, with the first surface intersecting the second surface;
determining a third surface in said model, said third surface intersecting the first and the second surface and defining with the first surface and second surface a closed space of said model;
for each current point of a set of points of the closed space, determining a distance value depending on:
a first distance from said current point to a union of the first surface and of the second surface;
a second distance from said current point to the third surface;
receiving an average value;
for each current point of said set of points of the closed space, determining a presence of caves for said current point, with this determination of the presence of caves depending at least on the received average value and on the distance value determined for said current point.

The geological model is, for example, a model meshed in three dimensions.

Advantageously, the third determined surface is vertical in the model, with an axis of the mark of the model defining this vertical.

The determination of the presence of caves can be represented by a binary variable, said variable being 0 if caves are present at the current point, 1 if caves are not present at the current point.

Furthermore, the determination of the presence of caves for said current point can also depend on a variogram or on a variance function of the "interdistance" or on a covariance function.

In a particular embodiment of the invention, the method can further comprise:
for each current point of the points for which a presence of caves is determined, determination of the size of said caves, with the determination of the size of said caves depending on at least one distribution of sizes of caves and on the distance value determined for said current point.

Furthermore, the method can comprise:
for each current point of the points for which a presence of caves is determined, determination of a number of caves, with the determination of said number of caves depending on at least one distribution of the number of caves and on the distance value determined for said current point.

Advantageously, the method can further comprise:
for each current point of the points for which a presence of caves is determined,
determination of a collapse of caves for said current point, with this determination depending on a probability of collapse, and
in the case of a determined presence of caves, multiplication of a proportion of caves associated with the current point by a factor between 3 and 5.

The probability of collapse can be 0 for certain current points and 1 for other current points.

The proportion of caves represents the ratio between the volume of the caves over the unit volume associated with the current point (e.g. of the mesh associated with the current point). As such, this multiplication reverts to increasing the portion of "caves" in the model for a given point.

As such, this multiplication makes it possible to define the collapsed volume, corresponding to the blooming of rocks, "brecciated" material with intermediate characteristics between the matrix and the preserved non-collapsed caves.

The multiplication of the proportion de caves associated with the current point can be carried out by a factor 4.

Experimentally, this value of 4 is considered as being close to reality concerning the volume increase affected by caves during a collapse (i.e. rock volume fractured by the collapse). A more substantial volume (factor 10 to 40 in practice) can correspond to a weakening of the matrix that surrounds the caves, this is referred to an extended collapse.

Moreover, if the proportion of caves associated with the current point becomes greater than a predetermined threshold:

the portion of the proportion of caves exceeding said predetermined threshold can be added to the porosity of points adjacent to the current point, the proportion of caves of the current point can also be set to the predetermined threshold.

Moreover, different types of processes of lateral offsets can be considered such as vertical propagation for a simple collapse, propagation by fronts for an extended collapse, etc.

Furthermore the invention also relates to a method for determining the permeability characteristics of a geological model, with said method comprising:

determination of a location of karst caves in said geological model by the method according to one of claims 1 to 7;

determination of, for each current point of the points for which the determined value of the binary variable corresponds to the presence of caves, at least one permeability value depending on a size of caves for said point and on a number of caves for said point.

As such, this invention also relates to a device for determining a location of karst caves in a geological model, with the device comprising:

an interface for receiving a geological model;

an interface for receiving a first surface and a second surface, said first and second surfaces being defined in said geological model, with the first surface intersecting the second surface;

a circuit for determining a third surface in said model, said third surface intersecting the first and the second surface and defining with the first surface and the second surface a closed space of said model;

for each current point of a set of points of the closed space, a circuit for determining a distance value depending on:

a first distance from said current point to the union of the first surface and of the second surface;

a second distance from said current point to the third surface;

an interface for receiving an average value;

for each current point of said set of points of the closed space, a circuit for determining a presence of caves for said current point, with this determination of the presence of caves depending at least on the received average value and on the distance value determined for said current point.

A computer program, implementing all or a portion of the method described hereinabove, installed on pre-existing equipment, is in itself advantageous.

As such, this invention also relates to a computer program comprising instructions for the implementing of the method described hereinabove, when this program is executed by a processor.

This program can use any programming language (for example, an object-oriented language or other), and be in the form of an interpretable source code, partially-compiled code or fully-compiled code.

Figure 6:
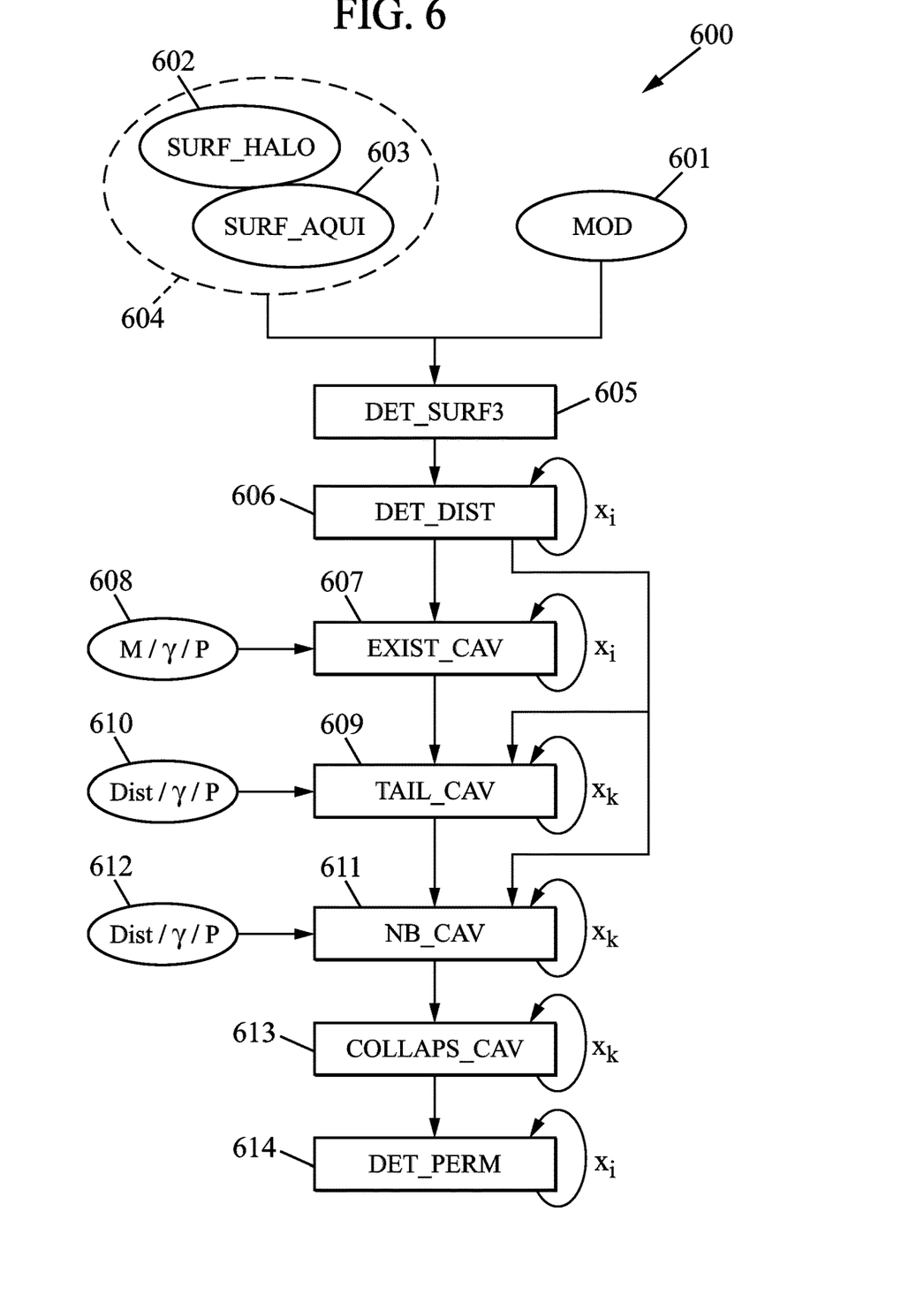
FIG. 6 shows a flow chart of a method for determining in an embodiment according to the invention.

FIG. 6 described in detail hereinafter can form the flow chart of the general algorithm of such a computer program.

BRIEF DESCRIPTION OF THE DRAWINGS

Other characteristics and advantages of the invention shall appear when reading the following description. The latter is purely for the purposes of illustration and must be read with respect to the annexed drawings wherein.

DETAILED DESCRIPTION OF THE DRAWINGS

Figure 1:
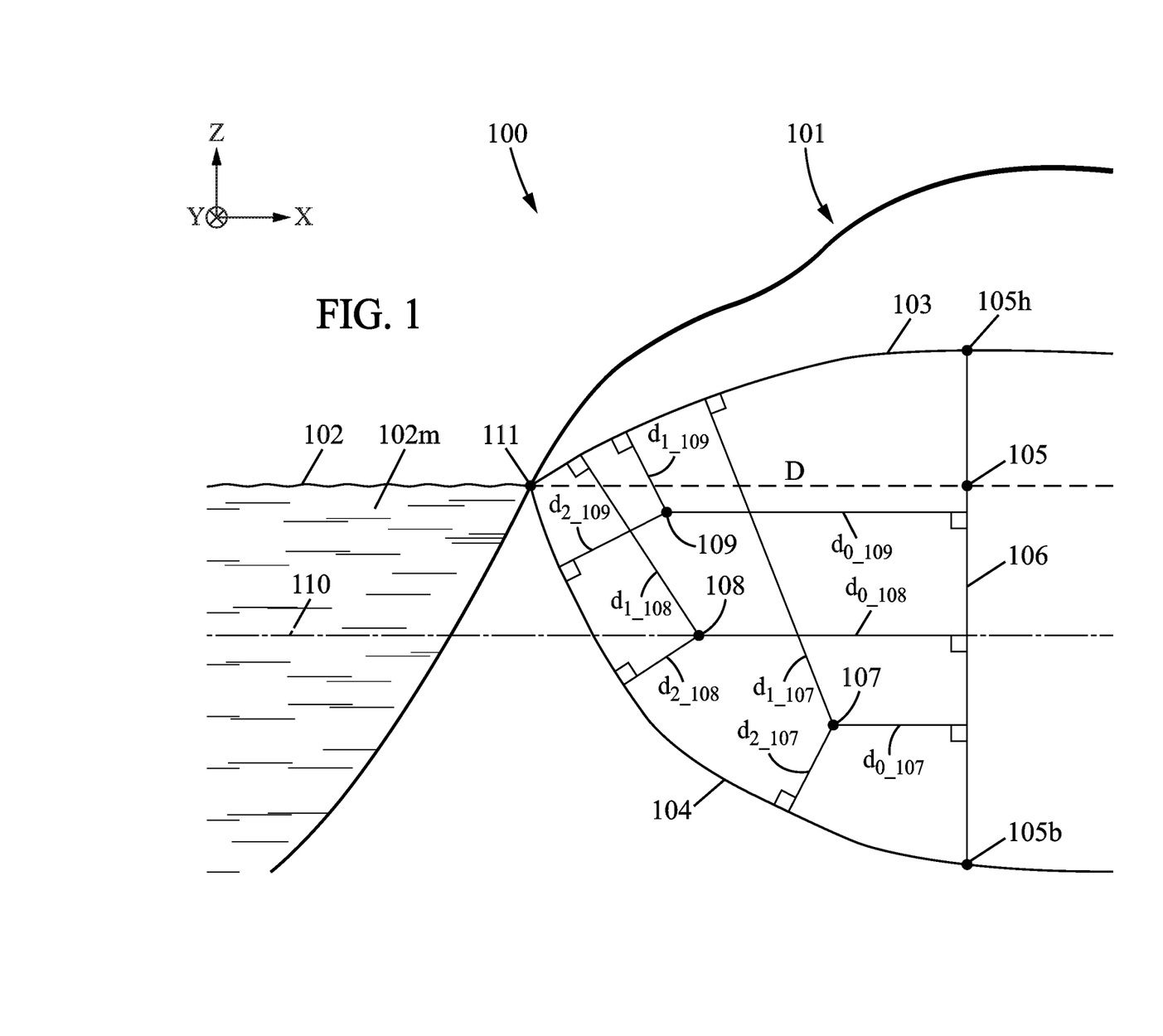
FIG. 1 shows a vertical cross-section of a geological model and which makes it possible to detail the calculation of the distance values in a particular embodiment of the invention.

FIG. 1 shows a vertical cross-section 100 of a geological model and which makes it possible to detail the calculation of the distance values in a particular embodiment of the invention.

In this cross-section 100, the line 101 represents the outer surface of a geological formation, for example an island or a shore. Moreover, the line 102 represents the level of the sea at a given geological moment. As such, the zone 102m represents the sea water in the model.

The surfaces 103 and 104 respectively represent the aquifer surface and the halocline surface: as such these two surfaces 103 and 104 cross at the point 111 of intersection between the level of the sea 102 and the geological formation 101.

Geologically under the surface 104 (according to the axis the geological formation comprises saline water;

above the surface 103 (according to the axis the geological formation does not comprise water (or only partially);

between the surfaces 103 and 104, the geological formation 101 comprises fresh water.

Of course, the surfaces are only models of natural phenomena and the various transitions between the zones described hereinabove are not clear (a transition gradient exists in a zone on either side of the surfaces 103 and 104).

Experimentally, it was observed that the formation of cavities in the substratum, formed by a phenomenon of karstification of the substratum (e.g. limestone rock) is more substantial around the surfaces 103 and 104.

In the geological model, the surfaces 103 and 104 can be expresses/received in several ways:

explicitly, with the shape of these surfaces being received explicitly;

implicitly, only certain characteristics of these surfaces being received (e.g. the distance D from point 105 to point 111—distance for which the surface reaches its maximum/minimum height or 95% of its maximum/minimum height and the maximum/minimum height defined as such at point 105).

Moreover, it is possible to receive only one of the two surfaces, supposing for example that the surface 103 makes it possible to determine the surface 104 using a horizontal symmetry, then by the application of a scale factor in a vertical direction.

Likewise, it is possible to receive only one surface that in reality represents the union of the surfaces 103 and 104.

Once these surfaces 103 and 104 defined in the model, it is possible to determine a third surface 106 making it possible to define, with the surfaces 103 and 104 a closed space of the model.

The surface 106 is a surface that has, for any vertical section of the geological model, one or several linear or vertical sections (i.e. the points 105$h$, 105, 105$b$ define a straight line parallel to the axis $\vec{z}$ of the model).

This surface 106 can be defined as a surface passing through all of the vertical straight lines passing through the points 105 such as defined hereinabove.

As such, once the closed space defined by the surfaces 103, 104 and 106, it is possible to determine a distance value for all of the points of this space, with the distance value being a number representing the relative proximity of the point in question to the surface 103 or 104 in relation to the proximity of this point in question to the surface 106. For example, the distance value of the of the point 107 $VD_{107}$ can be expressed in the form $$VD_{107} = \frac{\min(d_{1\_107}; d_{2\_107})}{d_{0\_107} + \min(d_{1\_107}; d_{2\_107})}$$

with $d_{0\_107}$ the distance from the point 107 to the surface 106, $d_{1\_107}$ the distance from the point 107 to the surface 103 and $d_{2\_107}$ the distance of the point 107 to the surface 104. Likewise, the distance value of the point 108 $VD_{108}$ can be expressed in the form $$VD_{108} = \frac{\min(d_{1\_108}; d_{2\_108})}{d_{0\_108} + \min(d_{1\_108}; d_{2\_108})}$$

with $d_{0\_108}$ the distance from the point 108 to the surface 106, $d_{1\_108}$ the distance from the point 108 to the surface 103 and $d_{2\_108}$ the distance from the point 108 to the surface 104. Finally, the distance value of the point 109 $VD_{109}$ can be expressed in the form $$VD_{109} = \frac{\min(d_{1\_109}; d_{2\_109})}{d_{0\_109} + \min(d_{1\_109}; d_{2\_109})}$$

with $d_{0\_109}$ the distance from the point 109 to the surface 106, $d_{1\_109}$ the distance from the point 109 to the surface 103 and $d_{2\_109}$ the distance from the point 109 to the surface 104.

Of course, with a concern for simplification, it is considered that the various distances of the points mentioned hereinabove (107, 108 and 109) are located in the plane of FIG. 1, but in more complex situations, and due to the fact that the geological model is potentially a three-dimensional model, the distances can be located in a plane other than the plane of FIG. 1.

Other methods for determining distance values can be considered such as for example the fact of weighting certain terms of the preceding formulas (by possibly standardising the result between 0 and 1).

The distances are distances in the mathematical sense. As such, the distances can be Euclidean distances, Manhattan distances, Minkiswski distances, Tchebychev distances or any other distances.

Figure 2:
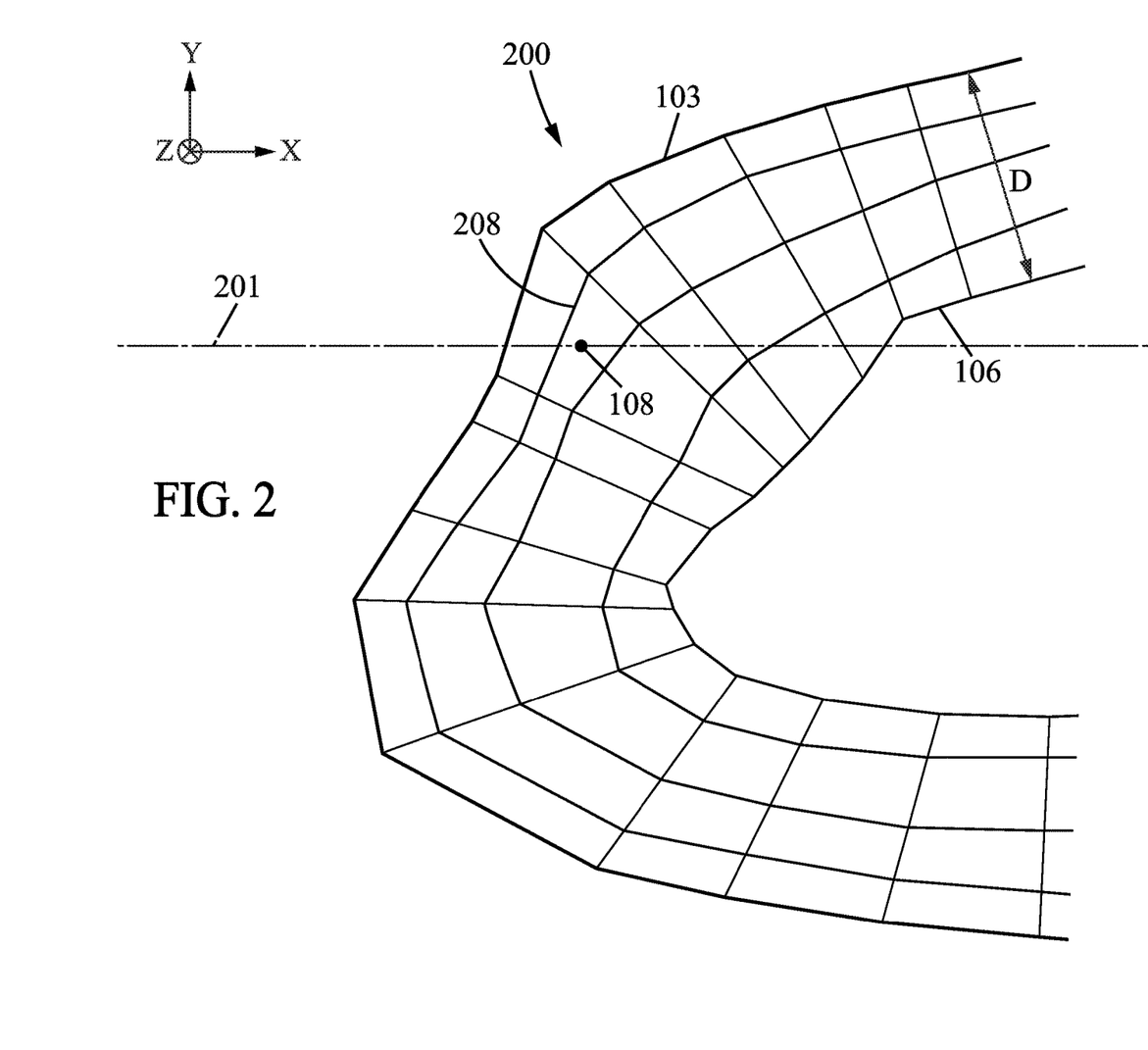
FIG. 2 shows a horizontal cross-section of said geological model.

FIG. 2 shows a horizontal cross-section 200 of said geological model 100 according to a plane 110 perpendicular to the plane of FIG. 1. As such, FIG. 1 is also a cross-section of FIG. 2 according to the plan 201 perpendicular to the plan of FIG. 2.

The geological model is then represented in the form of meshes. It is possible to define, for each mesh (e.g. 208), a point of the model (e.g. 108) corresponding to the centre of the mesh (e.g. its barycentre). Then, there is no difference between carrying out an operation (calculation, etc.) for a mesh or for a point associated with this mesh.

Figure 3:
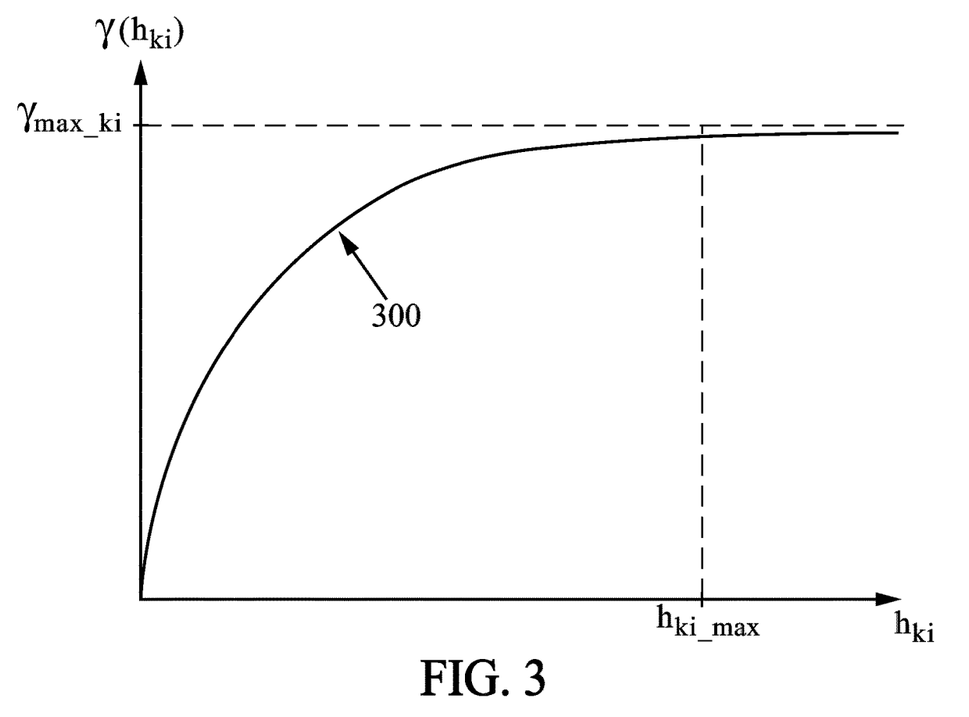
FIG. 3 is an example of a variogram in a particular embodiment.

FIG. 3 is an example of a variogram in a particular embodiment of the invention.

A variogram 300 is a mathematical tool that makes it possible, in particular in geostatistics, to define a spatial change of a random variable X. As such, it makes it possible to define, as a function of the inter-distance $h_{ki}$ of two points in the direction $\vec{k_i}$, a correlation between the values taken by this random variable X:

$$\gamma(h_{ki}) = \tfrac{1}{2} E_{|y-x|=h}(|X(x)-X(y)|^2)$$

As such, in the framework of the curve 300, it is possible to observe that the random variable X no longer has any correlation for substantial inter-distances: as such, the term extent of the variogram $h_{ki\_max}$ is used to refer to the inter-distance value for which the variogram is greater than 95% of its maximum value $\gamma_{max\_ki}$.

Figure 4A:
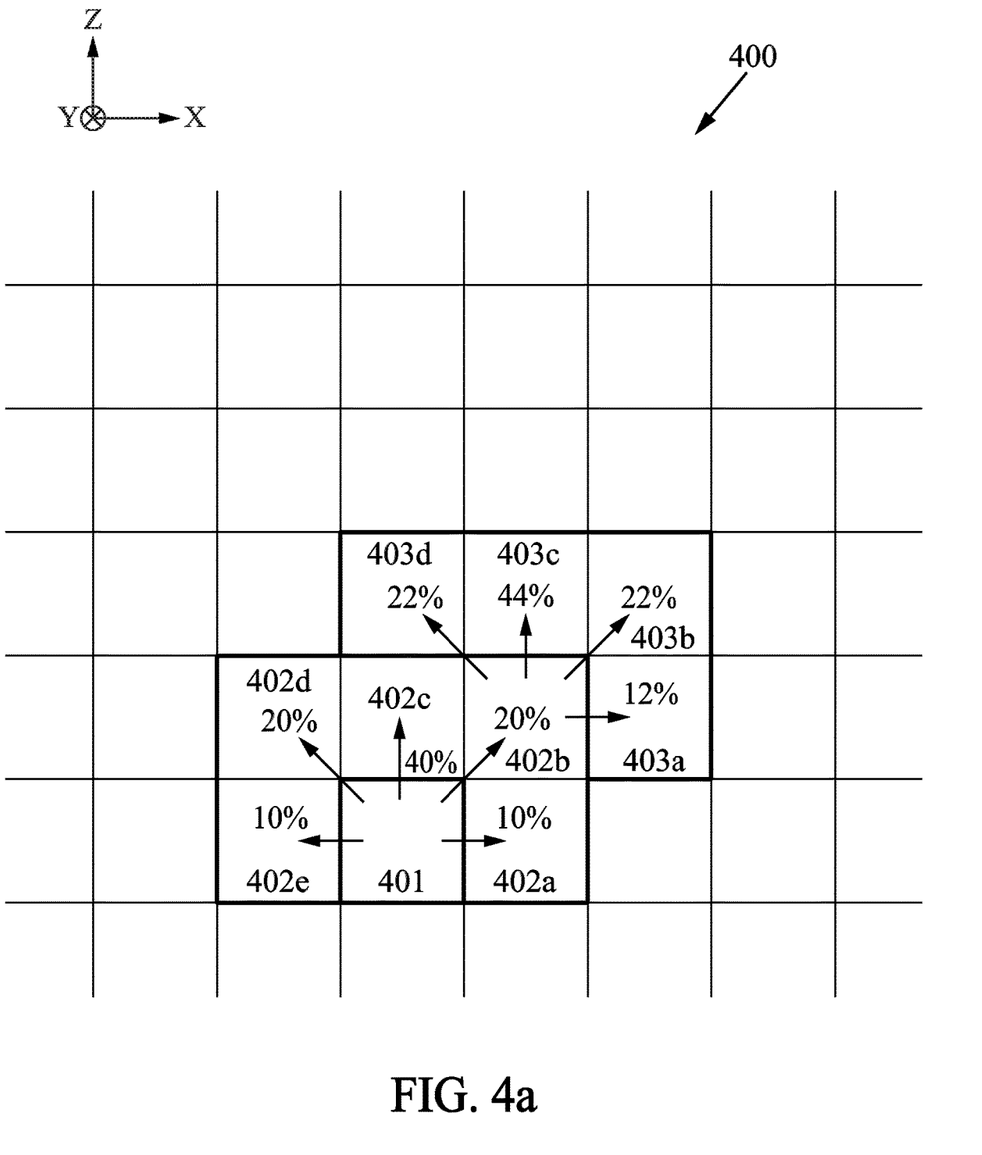
FIGS. 4a and 4b show the collapse phenomenon of the caves in a particular embodiment of the invention.

FIG. 4$a$ shows the phenomenon of the collapse of caves in a particular embodiment of the invention.

For reasons of simplicity, the meshed network shown is a regular network, but the following teachings are also applicable to non-regular networks.

In the case of FIG. 4$a$, it is considered that the proportion of caves/void of the mesh 401 is 0.75 (i.e. 75% of the volume of the mesh is constituted of caves and 25% of the volume of the mesh is constituted of matrix rock). This proportion P can be calculated easily if the number of caves is known in the mesh and the size of these caves and the dimensions of the mesh are also known. For example:

$$P = \frac{N \cdot \tfrac{4}{3}\pi a \cdot b \cdot c}{A \cdot B \cdot C}$$

with the cave of elliptical shape with radiuses a, b and c, with the mesh being a parallelepiped with dimensions A, B and C, the number of caves in the mesh being N.

If the mesh 401 is determined as being collapsed, the proportion of the model affected by the phenomena of collapse is experimentally multiplied by a multiplication factor equal to 4 in relation to the initial proportion of caves (in the least, this value is close to 4, for example between 3 and 5).

However, if the value 0.75 is multiplied by 4, it is possible to see that the proportion of void would be greater than 1. Then, it is possible to follow the following method in order to determine the final proportion affected by the collapse phenomena in a mesh considered as being collapsed:

if the initial value of proportion (VPI) of void multiplied by the multiplication factor (FM) is less than a predetermined threshold (SP) (for example, 0.9 or 1), the final value of proportion (VPF) of void is set to the result of this multiplication (i.e. VPF=VPI.FM);

if the initial value of proportion (VPI) of void multiplied by the multiplication factor (FM) is greater than the predetermined threshold (SP), the final value of proportion of void is set to the predetermined threshold (i.e. VPF=SP);

the portion of the proportion of caves exceeding said predetermined threshold (i.e. VPI.FM-SP) is added to the porosity of certain adjacent meshes and in particular those located above the mesh in question. The distribution of this portion VPI.FM-SP is not necessarily carried out in an equal manner (i.e. if the distribution of this portion is carried out in three meshes, the void proportion of each one of these three meshes is not necessarily carried out in thirds).

The process described can then be reiterated in the meshes for which a distribution of the portion of the proportion of caves exceeding said predetermined threshold has been carried out.

For example, and in order to illustrate this method, it is supposed that the mesh 401 is indicated as having collapsed (this indication can be done by a user, or be done following a stochastic process for determining cave collapse e.g. 20% of the meshes are "collapsed" in the model) and that the predetermined threshold value is 0.8.

As such, the proportion of caves of the mesh 401 (initially at 0.75) becomes 0.8 (i.e. min (0.8; 0.75.4)). The portion of the proportion of caves exceeding the predetermined threshold is then 2.2 (i.e. 4×0.75−0−8).

In this example, the distribution of this portion is set as follows:

10% to the adjacent meshes located on the same horizontal plane as the mesh 401 (i.e. the meshes 402*e* and 402*a*);

20% to the adjacent meshes located at the top, in diagonal, of the mesh 401 (i.e. the meshes 402*b* and 402*d*);

40% to the adjacent meshes located above the mesh 401 (i.e. the mesh 402*c*);

0% for the other meshes.

Of course, this distribution operates in a two-dimensional model.

Then, the proportion of caves of the mesh 402*e* or 402*a* is increased by 0.22, the proportion of caves of the mesh 402*b* or 402*d* is increased by 0.44, and the proportion of caves of the mesh 402*c* is increased 0.88.

If, for example, the proportion of caves of the mesh 402*b* is greater than 0.8 (the predetermined threshold value), it is possible to reiterate the same algorithm (by possibly modifying the distribution as indicated in FIG. 4*a*, as the number of adjacent cells not already "collapsed" is different).

The collapse defined hereinabove (and characterised, for example, by a factor 4) is a "simple" collapse which can be limited, in practice, to the mesh in question and to the vertical meshes located above the latter. As such, in a particular embodiment, it is possible to provide that the propagation to the mesh 402*c* is not 40% only but 100%.

Figure 4B:
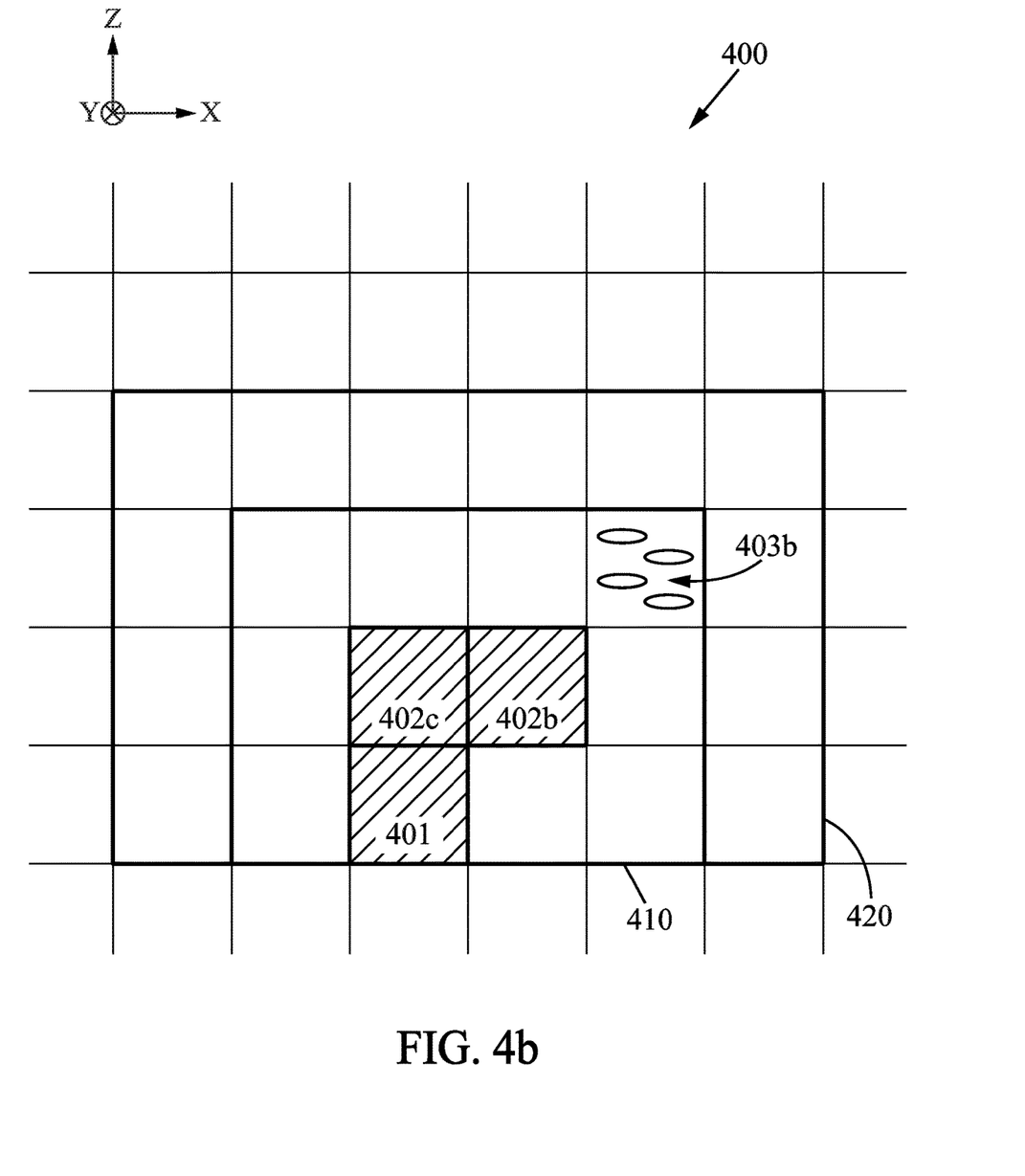

Moreover, it is possible to observe that the simple collapse also has an impact on the surrounding meshes by modifying its structure: this phenomenon is referred to as "extended collapse". This latter phenomenon is shown in FIG. 4*b*.

If the meshes 401, 402*c* and 402*b* are considered as "collapsed", it is possible to determine a determined number of propagation fronts of this "extended collapse":

the first front 410 comprising the meshes adjacent to the "collapsed" meshes located at a dimension z greater than or equal to these "collapsed" meshes (z being the axis considered as a vertical axis in the model), with the meshes of the first front not being meshes considered as belonging to the extended collapse (but only to the simple collapse);

the second front 420 comprising the meshes adjacent to the meshes of the first front, located at a dimension z greater than or equal to these meshes of the first front, with the meshes of the second front not being extended collapse meshes or meshes of the first front;

etc.

The determined number of fronts can be a value set by an external user (e.g. 2).

Once these fronts are identified, it is possible to exclude, in an embodiment, the meshes that comprise meshes that have caves (e.g. 403*b*) from the meshes of the different fronts.

Then, it is possible to interpolate as a function of the rank of the front in question a proportion of void representing the weakening of the rock in an interval ranging to the proportion of void of the matrix (i.e. of the rock without caves, conduits or fractures) to the void proportion of the "collapsed" meshes. For example, if the proportion of the matrix is 2% and if the proportion of the mesh 401 is 80%, it is possible to determine the proportion value of the meshes of the front n (with $N_{max}$ the determined number of fronts) by a linear interpolation:

$$P = \left[ (2 + 80) \frac{N_{max} + 1 - n}{N_{max} + 1} \right] \%$$

Any other interpolation (i.e. other than linear) is possible in this interval.

The value P can be the new proportion value of the mesh or a value which is added to the existing proportion, according to the embodiment of the invention.

Figure 5A:
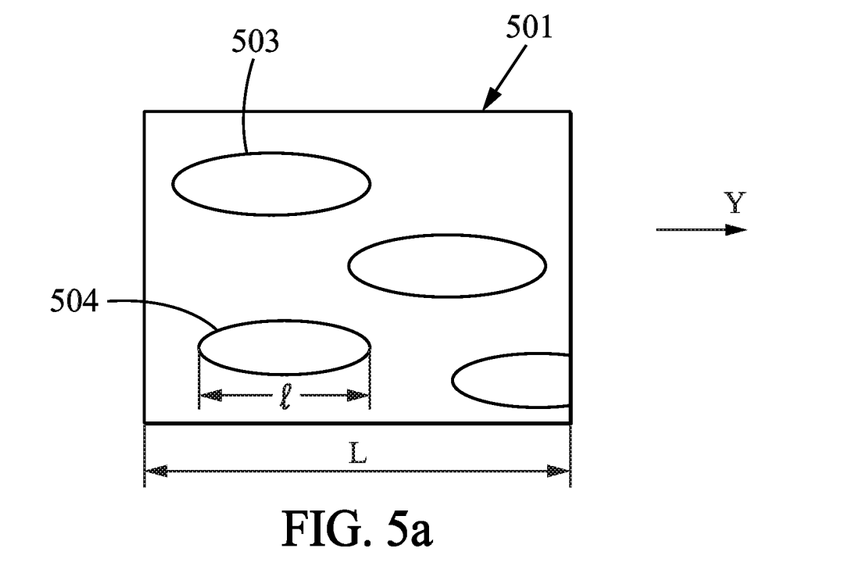
FIG. 5 shows an example of a permeability calculation of a mesh according to un axis in a particular embodiment of the invention.
Figure 5B:
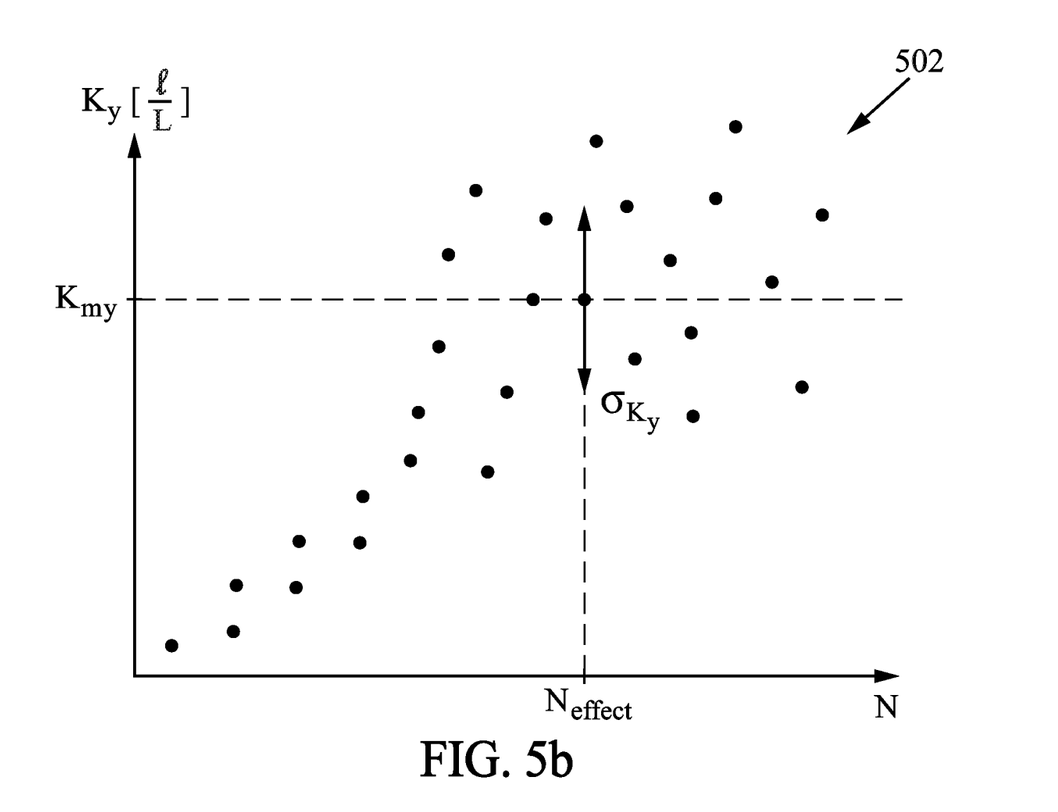

FIG. 5 shows an example of a permeability calculation of a mesh according to an axis in a particular embodiment of the invention.

The calculation of the permeability of a model comprised of a large number of meshes which themselves contain caves of different sizes and shapes can be complex and the calculation time can be substantial.

As such, in order to simplify this permeability calculation, a statistical approach is proposed. Indeed, it is possible to determine experimentally or using conventional fluid flow tools of the permeability values according to an axis $\vec{\gamma}$ for a mesh of dimension L (according to an axis parallel to $\vec{\gamma}$) comprising N caves that have a dimension l (according to an axis parallel to $\vec{\gamma}$), for different values of N and de l/L.

This determination makes it possible to obtain in a database a plurality of curves 502 that indicate, for a given ratio l/L, the statistical relation in the number of caves and the permeability $K_y$ according to the axis $\vec{\gamma}$.

Then, for a given mesh of the model 101 (this having a given ratio l/L), it is possible to find in the database the curve 502 that corresponds to the ratio l/L. Finally, if the given mesh comprises $N_{effect}$ caves, it is possible thanks to the curve 502 to determine the average permeability $K_{my}$ according to the axis $\vec{\gamma}$ for this mesh as well as, if needed, the variance of this permeability $\sigma_{K_y}$.

FIG. 6 shows a flow chart 600 of a method for determining in an embodiment according to the invention.

This flow chart 600 has a certain number of steps, all of the steps are not necessarily indispensable in all of the embodiments of the invention.

As indicated in relation with FIG. 1, it is possible to receive a model 601 (for example, a meshed three-dimensional model) and two surfaces 602 and 603 (respectively a surface representing the halocline surface of the model and a surface representing the aquifer surface of the model). Of course, the surfaces 602 and 603 can constitute a single surface 604 (i.e. union of these surfaces).

Once received, it is possible to determine (step 605), as detailed hereinabove, a third vertical surface in the model (with an axis being taken as being a "vertical" direction of this model) and making it possible to define a closed space with the surfaces 602 and 603.

Then, for all of the points of the coordinates $x_i$ ($x_i \in R^3$) of the closed space, it is possible to define (step 606) a distance value between 0 and 1 and as detailed hereinabove.

Once the distance value defined for all of the points $x_i$, it is possible to carry out a series of random drawings in order to determine (step 607) if the point of coordinates $x_i$ is a point for which caves exist in the model. This determination can be according to a known average M (608) of the proportion of caves for these points $x_i$. If only the average M is used for this determination, it is for example possible to carry out random drawings of a continuous and constant variable over the interval [0;1] and if the result of this drawing is less than M, the point $x_i$ is marked as being associated with caves in the model.

However, as it may be desirable that the determined caves be close to the surfaces 602 and 603 (see surfaces 103 and 104 of FIG. 1) as it is observed experimentally that the phenomenon of karstification of cavities is located in the vicinity of these surfaces. As such, it is possible to carry out a cosimulation with the average M as a main variable and the distance determined in the step 606 as an auxiliary variable.

For example, if the random variable C represents the probability of the presence of a cave for the point $x_i$, it would be possible to write:

$$C(x_i) = M + \alpha(VD(x_i) - \overline{VD})$$

with $VD(x_i)$ the distance value for the point xi, $\overline{VD}$ the average of the distance values for all of the points of the closed space defined hereinabove, α a weighting variable between 0 and 1.

Furthermore, it is possible to have intervene one or several variograms γ (e.g. one per axis of the mark of the model) in order to, correlate the various random drawings in the model:

$$C(x_i) = M + \sum_{l=1}^{N_{princ}} \lambda_l (C(x_l) - \overline{C}_l) + \sum_{m=1}^{N_{aux}} v_m (VD(x_m) - \overline{VD})$$

with furthermore $N_{princ}$ the number of points of a zone around the point $x_i$ located at an equal distance to the extent of the variogram (or another predetermined distance) for which a determination of the presence of caves has already been carried out, $N_{aux}$ the number of points of a zone around the point $x_i$ located at a distance equal to the extent of the variogram (or another predetermined distance), $\overline{C}_l$ the average of the values of $C(x_l)$ for the points $x_l$ located at a distance equal to the extent of the variogram (or another predetermined distance), $\lambda_l$ and $v_m$ being determined using the variogram (for example, via an exact resolution of a system of equations, by the method referred to as "collocated assumption"—or the so-called FFT method).

Once the existence des caves determined for each one of the points $x_i$ of the defined closed space, it is possible to determine the size of the caves associated with each point $x_k$ for which the effective presence of caves has been determined. In a first approach, it is possible to consider that all of the caves associated with the same cell (or point according to the representation chosen) have the same dimensions. In order to determine (step 609) the dimensions of the caves for a point $x_k$, it is possible to receive (610) a distribution DISTR of probability of the size of said caves. In a manner similar to the step 607, it is also possible to take into account the distance value determined in the step 606. Moreover, and similarly to the step 607, it is possible to receive a variogram y (610) which can be identical to the variogram 608 or proper to the size of the caves.

It is also possible to determine (step 611) the number of caves associated with each point $x_k$ for which the effective presence of caves has been determined. This determination can be carried out after the step 609, before the step 609 or even in parallel. In order to determine (step 609) the number of caves for a point $x_k$, it is possible to receive (612) a distribution DISTR of probability of the number of caves. In a manner similar to the step 607, it is also possible to take into account the distance value determined in the step 606. Moreover, and similarly to the step 607, it is possible to receive a variogram y (612) which can be identical to the variogram 608, to the variogram 610 or proper to the number of caves.

It is also possible, for the points $x_k$ for which the effective presence of caves has been determined to proceed with the collapse (step 613) of the caves as detailed with respect to FIG. 4a. The caves which are "collapsed" can be selected by a user or drawn randomly from among the points $x_k$ of the model.

Finally, it is possible to determine (step 614), for any point x, of the closed space defined, a permeability K for each direction of the mark of the model (average and variance) using the method described with respect to FIG. 5.

Then, the global permeability of the model can be determined without difficulty using conventional tools.

Figure 7:
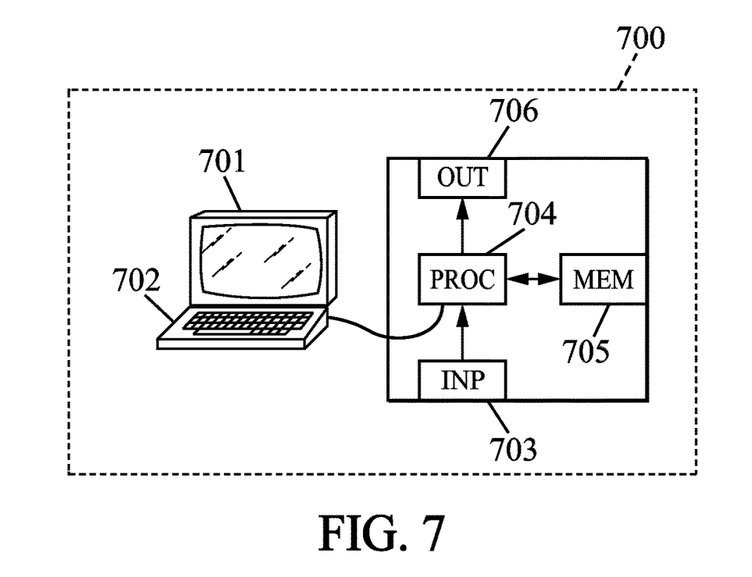
FIG. 7 shows an example of a device for determining in an embodiment of the invention.

FIG. 7 shows an example of a device for determining in an embodiment of the invention.

In this embodiment, the device comprises a computer 700, comprising a memory 705 for storing instructions allowing for the implementation of the method, the measurement data received, and of temporary data for carrying out the various steps of the method such as described hereinabove.

The computer further comprises a circuit 704. This circuit can be, for example:
a processor able to interpret instructions in the form of a computer program, or
an electronic board of which the steps of the method of the invention are described in the silicon, or
a programmable electronic chip such as a FPGA chip (for "Field-Programmable Gate Array").

This computer comprises an input interface 703 for the receiving of data concerning models, surfaces, and an output interface 706 for the supplying of the results. Finally, the computer can comprise, in order to allow for easy interaction with a user, a screen 701 and a keyboard 702. Of course, the keyboard is optional, in particular in the framework of a computer that has the form of a tactile tablet, for example.

Moreover, the functional diagram shown in FIG. 6 is a typical example of a program of which certain instructions can be carried out with the equipment described. As such, FIG. 6 can correspond to the flow chart of the general algorithm of a computer program in terms of the invention.

Of course, this invention is not limited to the embodiments described hereinabove by way of example; it extends to other alternatives.

Other embodiments are possible.

For example, if the model shown in the various examples of the description is a three-dimensional model, it is also possible to use two-dimensional models.

The invention claimed is:

1. A method for determining a location of karst caves in a geological model of a subsoil,
the method comprising the steps of:
receiving a geological model;
receiving a first surface and a second surface, said first and second surfaces being defined in said geological model, with the first surface intersecting the second surface;
determining a third surface in said model, said third surface intersecting the first and the second surface and defining with the first surface and second surface a closed space of said model;
for each current point of a set of points of the closed space, determining a distance value depending on:
a first distance from said current point to a union of the first surface and of the second surface;
a second distance from said current point to the third surface;
receiving an average value of a proportion of caves for the set of points;
for each current point of said set of points of the closed space, determining a presence of caves for said current point, with this determination of the presence of caves depending at least on the received average value and on the distance value determined for said current point; and
determining an estimate of the hydrocarbon resources present in the subsoil based on the determining of the presence of caves.

2. The method according to claim 1, wherein the determination of the presence of caves for said current point is also a function of a variogram.

3. The method according to claim 1, wherein the method further comprises:
for each current point of the points for which a presence of caves is determined, determining the size of said caves, with the determination of the size of said caves depending on at least one distribution of sizes of caves and on the distance value determined for said current point.

4. The method according to claim 1, wherein the method further comprises:
for each current point of the points for which a presence of caves is determined, determining a number of caves, with the determination of said number of caves depending on at least one distribution of the number of caves and on the distance value determined for said current point.

5. The method according to claim 1, wherein the method further comprises:
for each current point of the points for which a presence of caves is determined,
determining a collapse of caves for said current point, this determination depending on a probability of collapse, and
in the case of a determined presence of caves, multiplication of a proportion of caves associated with the current point by a factor between 3 and 5, with the result of the multiplication being referred to as proportion of collapsed material,
wherein the proportion of caves associated with the current point is a ratio between a volume of the caves associated with the current point over a unit volume.

6. The method according to claim 5, wherein the multiplication of the proportion of caves associated with the current point is carried out by a factor 4.

7. The method according to claim 5, wherein if the proportion of collapsed material associated with the current point is greater than a predetermined threshold:
a value of the proportion of collapsed material exceeding said predetermined threshold is additively distributed to the porosity of points adjacent to the current point,
the proportion of collapsed material of the current point is set to the predetermined threshold.

8. A method for determining characteristics of permeability of a geological model, said method comprising:
determining a location of karst caves in said geological model by the method according to claim 1;
determining, for each current point of the points for which the presence of caves has been determined, at least one permeability value depending on a size of caves for said point and on a number of caves for said point.

9. A computer program product comprising instructions for the implementation of the method according to claim 1, when this program is executed by a processor.

10. A device for determining a location of karst caves in a geological model in a subsoil,
the device comprising:
an interface for receiving a geological model;
an interface for receiving a first surface and a second surface, said first and second surfaces being defined in said geological model, with the first surface intersecting the second surface;
a circuit for determining a third surface in said model, said third surface intersecting the first and the second surface and defining with the first surface and second surface a closed space of said model;
for each current point of a set of points of the closed space, a circuit for determining a distance value depending on:
a first distance from said current point to a union of the first surface and of the second surface;
a second distance from said current point to the third surface;
an interface for receiving an average value of a proportion of caves for the set of points;
for each current point of said set of points of the closed space, a circuit for determining a presence of caves for said current point, with this determination of the presence of caves depending at least on the received average value and on the distance value determined for said current point; and
a circuit for determining an estimate of the hydrocarbon resources present in the subsoil based on the determining of the presence of caves.

* * * * *